United States Patent [19]

Stamper

[11] 4,362,309
[45] Dec. 7, 1982

[54] TRASH CAN HAULER

[75] Inventor: James F. Stamper, Nashville, Ind.

[73] Assignee: Seymour Division of Lear Siegler, Inc., Seymour, Ind.

[21] Appl. No.: 223,178

[22] Filed: Jan. 7, 1981

[51] Int. Cl.[3] .............................................. B62B 3/02
[52] U.S. Cl. .................................. 280/47.19; 211/71; 248/129; 248/172; 248/DIG. 7; 280/47.33
[58] Field of Search ............... 280/47.17, 47.19, 47.26, 280/47.33, 47.18; 211/71; 248/129, DIG. 7, 172; D34/17, 24

[56] References Cited

U.S. PATENT DOCUMENTS

| Re. 27,437 | 7/1972 | Bailey ................................ 280/47.19 |
| D. 204,753 | 5/1966 | Shepherd ............................ D34/24 |
| D. 219,581 | 12/1970 | Parsons ............................... D34/24 |
| 3,063,730 | 11/1962 | Domoradzki ................ 280/47.18 X |
| 3,104,890 | 9/1963 | Hill ................................. 280/47.18 X |
| 3,341,219 | 9/1967 | Marini et al. ..................... 280/47.19 |

Primary Examiner—Robert J. Spar
Assistant Examiner—Donald W. Underwood
Attorney, Agent, or Firm—Reising, Ethington, Barnard, Perry & Brooks

[57] ABSTRACT

A trash can hauler including a pair of longitudinally extending, skeletal trash can supports interconnected by U-shaped beam members. The supports include lower beams to support the bottom of a trash can. The supports include front, rear and upper beams adjacent the sides of the trash can to prevent lateral tipping thereof. The front and rear beams of the supports have telescopic connections to the upper and lower beams. A front beam member connected to the front beams has a pair of ground-engageable wheels rotatably secured thereto and a rear beam member connected to the rear beams has a ground-engageable portion. In one embodiment the connections between the supports and the front and rear beam members as well as the connections between the front and rear beams and the upper and lower beams are adjustable to enable positioning of the supports relative to the front and rear beam members to support any given size trash can.

6 Claims, 9 Drawing Figures

TRASH CAN HAULER

TECHNICAL FIELD

This invention relates to trash can haulers of the type used by householders for supporting trash cans as they are filled and for moving the trash cans to and from the location where they are emptied.

BACKGROUND ART

Trash can haulers are well known in the art and, in general, comprise a structure having a pair of wheels at the front end, a handle or a pair of handles at the rear end, a bottom support and a pair of rigidly interconnected side supports, all of which extend from front to rear to support the one or more trash cans as they are being filled. However, such trash can haulers have a number of disadvantages from the standpoint of utility, manufacture, and storage room they require.

Preferably, a trash can hauler should support not only the bottom of the trash can but also its sides to prevent the trash can from tipping while it is being filled or hauled. In order to prevent tipping, the side supports must be spaced closely adjacent the sides of the trash can. In fact, in some situations it is desirable that the side supports actually grip the sides of the trash can. However, trash cans are sold in a variety of shapes and sizes. Hence, a hauler with side and/or bottom supports spaced for one size of trash can are either too close or too far apart for another size of trash can. Even if the side supports are adjustable if, after adjustment, the side supports are rigidly interconnected, a householder may have trouble inserting and removing trash cans in such a hauler. Also, such rigidly interconnected side supports typically do not engagedly support the trash cans even after adjustment.

Some householders may need a hauler which can accommodate, for example, a pair of large trash cans whereas another householder may need a hauler which can accommodate perhaps three small trash cans. If the size of the hauler exceeds that needed by the householder, it uselessly occupies garage or other space needed for other purposes.

Trash can haulers are made and sold in a variety of sizes. But this gives rise to increased manufacturing and inventory expense prior to the householder's purchase.

The householder is presented with a variety of different size haulers from which to choose. Even if the householder chooses the right size hauler for his present needs, it may become the wrong size if the householder's needs change, as frequently occurs.

As a result, trash can haulers are commonly without side support. Also, it is not uncommon that any given retailer will inventory and hence have available for sale only one size hauler which is frequently not the size best suited to the customer's needs.

Many trash can haulers commonly in use require considerable inventory space and considerable retail floor space even when packaged and sold in knock-down form. This has the disadvantage of not only requiring excessive inventory and retail floor space but also the disadvantage that a bulky package is burdensome to carry and hence shunned by the potential customer. This leads to lost sales.

There is need, therefore, for a trash can hauler which overcomes these problems and disadvantages. The present invention fulfills this need.

DISCLOSURE OF THE INVENTION

The trash can hauler of the present invention provides both bottom and lateral support for trash cans, is flexible, preferably has adjustable bottom and side supports to support a wide variety of trash can shapes and sizes, and is adjustable in length to accommodate the precise number of trash cans used by the householder.

More specifically, the trash can hauler of the present invention includes a pair of trash can supports positioned in planes at an angle to each other. Each support has a lower beam to support the bottom of a trash can and upper front and rear beams to prevent lateral tipping thereof. The front ends of the supports have connections to a front member which has at least one ground-engageable wheel rotatably secured thereto. The rear ends of the supports have connections to a rear member which has a ground-engageable portion.

Preferably, the connections between the supports and the front and rear members are adjustable to allow the trash can supports to be moved relative to the front and rear members to laterally support any given size trash can above the ground.

Preferably, the supports are also adjustable in length, from front to rear, to allow the hauler to support one, two or three trash cans, as the user desires.

Preferably, the front and rear members are U-shaped to permit the supports interconnected thereby to flex with respect to each other.

Also, preferably, the hauler is constructed of components of sizes and shapes which permit the disassembled hauler to be packaged and stored in a compact container. Also, the components are such that they facilitate the assembly of the hauler and permit the assembled hauler to be easily adjusted, yet sturdy.

These and other features and advantages of the invention will be more fully understood from the detailed descriptions of the different embodiments which follow.

BEST MODE FOR CARRYING OUT THE INVENTION

Figure 1:
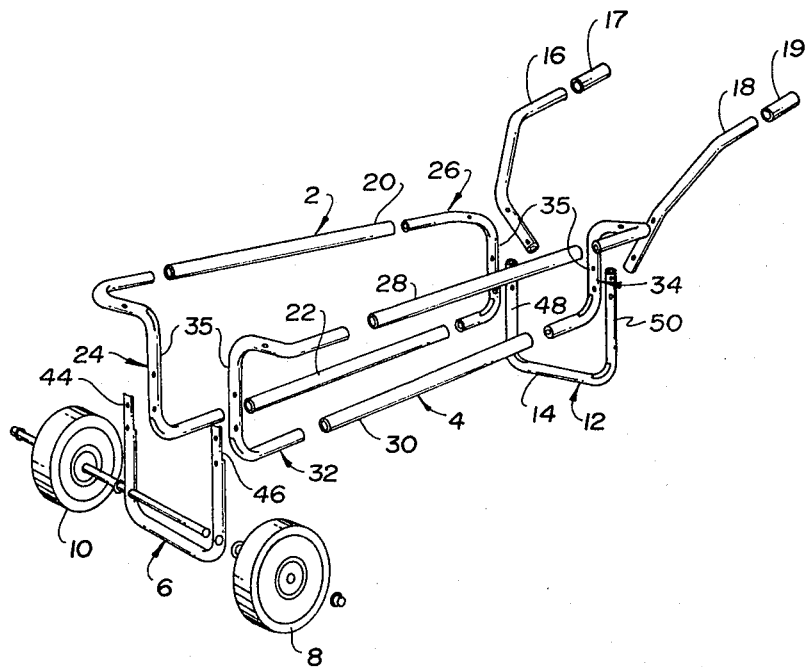
FIG. 1 is a perspective view of one embodiment of the invention.

Referring to FIG. 1, the trash can hauler shown has two trash can supports, 2 and 4, a front member or beam member 6 to which a pair of ground-engageable wheels, 8 and 10, are rotatably secured, and a rear member or beam member 12 with a bottom or lower beam portion 14 engageable with the ground and a pair of handles 16 and 18 having handle grips 17 and 19, respectively.

The front and rear members 6 and 12 are fixedly secured to the supports 2 and 4 by bolts and nuts (not shown).

If desirable, the trash can hauler may have an additional pair of wheels (not shown) rotatably secured to the rear member 12 in the same fashion the wheels 8 and 10 are secured to the front member 6.

The support 2 has a straight upper beam 20, a straight lower beam 22 which is spaced from and extends parallel to the upper beam 20, a bent U-shaped front beam 24, the ends of which telescope into and connect the forward ends of the upper and lower beams 20 and 22, respectively, and a bent U-shaped rear beam 26, the ends of which telescope into and connect the rearward ends of the upper and lower beams 20 and 22, respectively. The support 4 has a structure the same as that of the support 2, the straight upper and lower beams of support 4 being shown at 28 and 30, respectively, and the bent U-shaped front and rear beams of support 4 being shown at 32 and 34, respectively.

The upper and lower beams 20, 22, 28 and 30 are secured to their respective front and rear beams 24, 32, 26 and 34 by screws (not shown) which extend through holes which extend transversely through the upper and lower beams 20, 22, 28 and 30. The screws lockingly engage the outer exterior surface of the telescoping end portions of the front and rear beams 24, 32, 26 and 34.

The nuts and bolts used to secure the rear member 12 to the rear beams 26 and 34 are also used to secure the handles 16 and 18 to the rear member 12. Additional nuts and bolts (not shown) are used to directly secure the handles 16 and 18 to the rear beams 26 and 34.

The upper and lower beams 20, 28 and 22, 30 respectively, of the supports 2 and 4 are disposed in planes which are at an angle to each other, the lower beams 22 and 30 being spaced from and extending parallel to each other and the upper beams 20 and 28, likewise, being spaced from and extending parallel to each other, but with the spacing of the upper beams 20 and 28 being greater than that between the lower beams 22 and 30. The lower beams 22 and 30 are provided for supporting the bottoms of trash cans, shown in phantom at 36 and 38 in FIG. 2 placed on an adjustable trash can hauler of a second embodiment to be described in greater detail hereinbelow. The upper beams 20 and 28 are adjacent the sides of the trash cans to prevent them from tipping laterally. Vertically extending portions 35 of each of the front and rear beams 24, 26, 32 and 34 also prevent lateral tipping of the trash cans.

Figure 7:
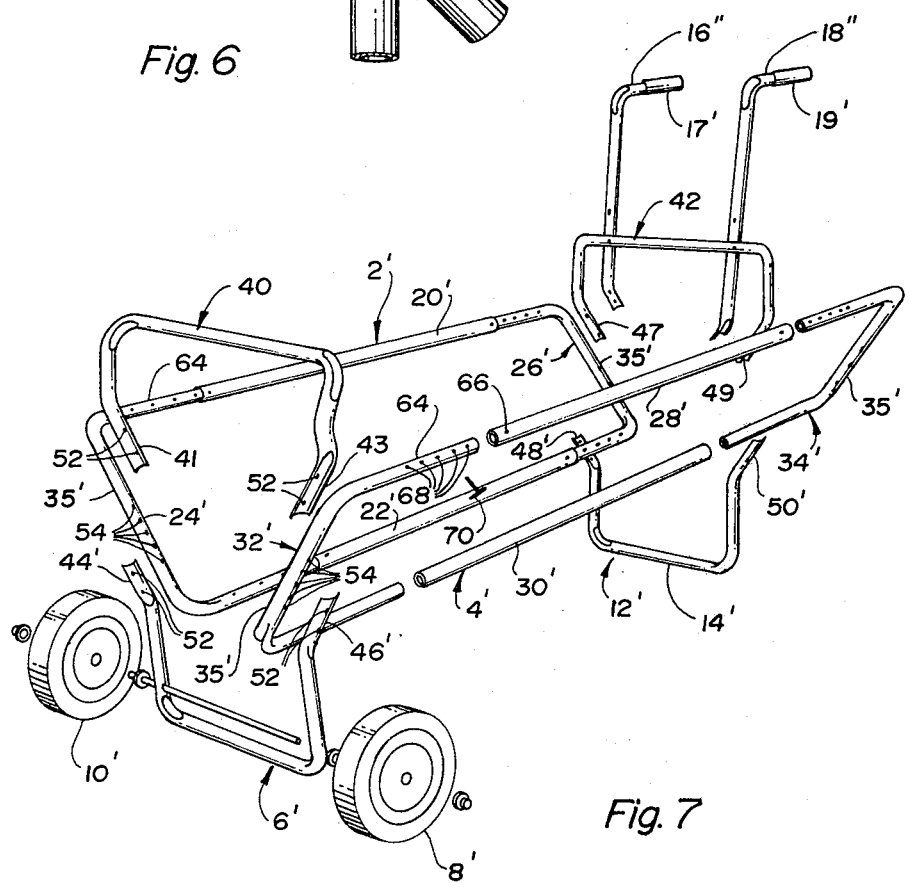
FIG. 7 is an exploded view of a slightly modified embodiment, and shows the various components and their manner of assembly.

The U-shaped front member 6 has spaced portions 44 and 46, as best shown in FIG. 7, which are disposed upwardly of the ground-engageable wheels. The portions 44 and 46 extend parallel to the vertically extending portions 35 of the front beams 24 and 32. Likewise, the bent U-shaped rear member 12 has spaced portions 48 and 50, which are disposed upwardly from the ground-engageable portion 14. The portions 48 and 50 extend parallel to the vertically extending portions 35 of the rear beams 26 and 34.

Referring now to FIGS. 2-9 there are shown alternative embodiments and modifications thereof of an adjustable trash can hauler and various connectors for the adjustable connections. The structures shown in FIGS. 2-9 which have the same or similar construction as those shown in FIG. 1 have a primed designation. Additional, new structures have no such derivative designation.

Figure 2:
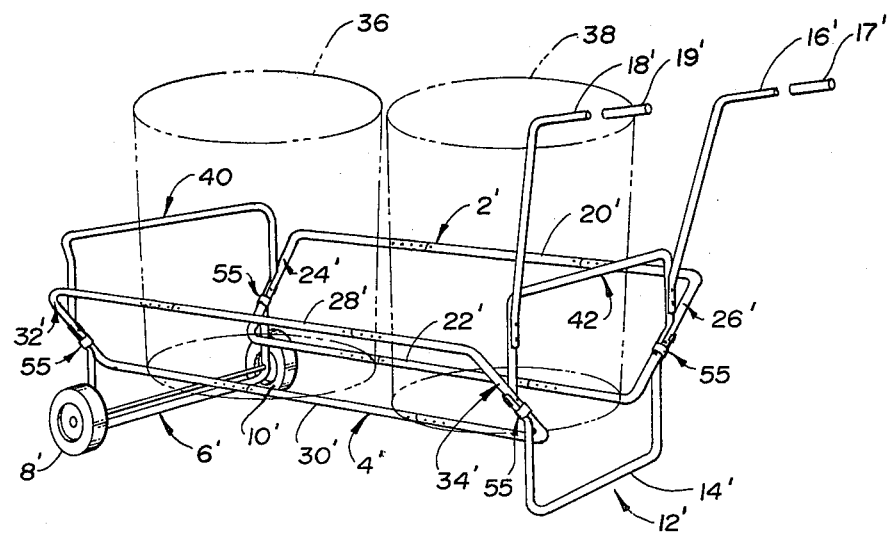
FIG. 2 is a perspective view of a second embodiment with a pair of trash cans shown in phantom.

Referring now to FIG. 2, there is shown a second, adjustable trash can hauler. A pair of U-shaped upper beam members 40 and 42 are optionally, adjustably secured at the ends of supports 2' and 4' to provide and support in addition to the end support provided by front and rear beams 24', 32', 26' and 34'. Handles 17' and 19' are fixedly connected at opposite ends of the rear upper beam member 42 by nuts and bolts.

Figure 8:
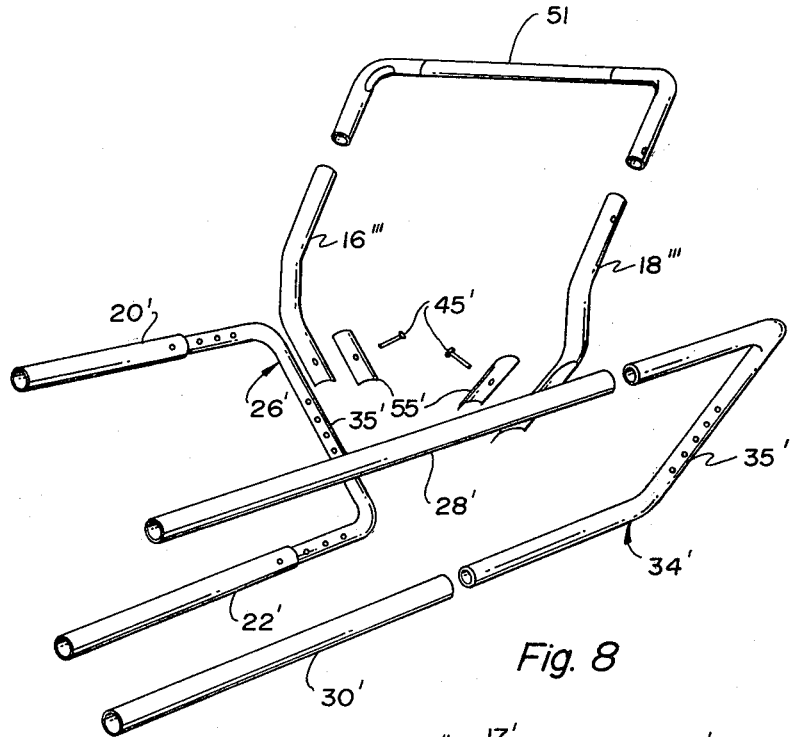
FIG. 8 is a perspective view, in enlarged scale and with the parts broken away of the FIG. 7 embodiment slightly modified and with a different adjustable connection.
Figure 9:
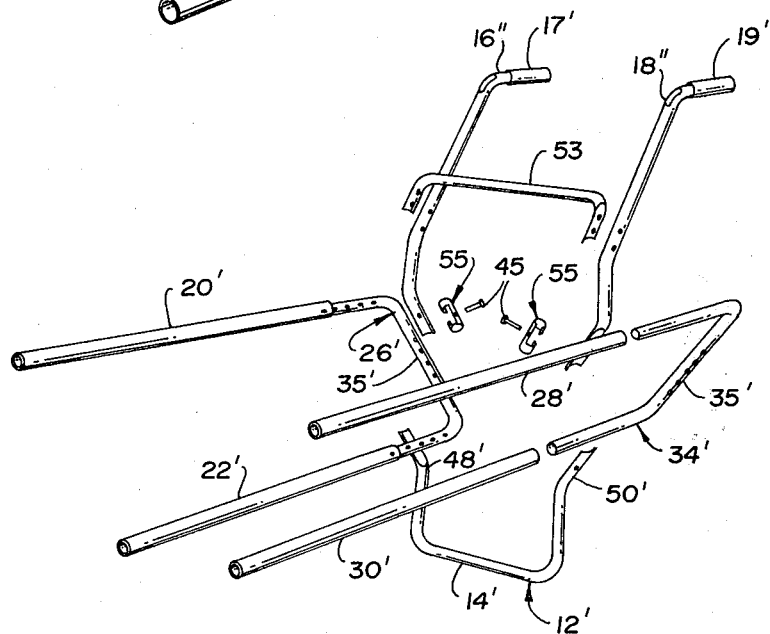
FIG. 9 is a perspective view and with the parts broken away of the FIG. 7 embodiment slightly modified and with the adjustable connection of FIG. 3 slightly modified.

Referring to FIG. 7, the front beams 24' and 32' are connected to portions 44' and 46', respectively of front member 6' and to the lower end portions 41 and 43 of the beam member 40. Likewise, the rear beams 26' and 34' are connected to portions 48' and 50', respectively of rear member 14' and to the lower end portions 47 and 49 of the beam member 42. As a modification of the trash can hauler of FIG. 2, handles 16" and 18" are also connected to the lower end portions 47 and 49 of the beam member 42. A slight modification of the embodiment of FIG. 7 is shown in FIGS. 8 and 9 wherein the handles 16", 18" and 16''' and 18''' are adjustably connected directly to their respective tubular portions 35'. In the modification of FIG. 8, the handles 16''' and 18''' are telescopically interconnected by a handle bar 51. In the modification of FIG. 9, the handles 16" and 18" are interconnected by a cross bar 53 and bolts (not shown). All of the support connections are adjustable so that the supports 2' and 4' can be moved upwardly and outwardly (to thereby increase the spacing between the lower beam 30' and 22' and to increase the spacing between the upper beams 20' and 28'), or downwardly and inwardly (to thereby decrease the spacing between the lower beams 30' and 22' and decrease the spacing between the upper beams 20' and 28'). Also, the connections are such that when the supports 2' and 4' are adjusted to the position desired, they can be locked in that position. Hence, the householder can adjust the positions of the supports 2' and 4' to accommodate the particular shapes and sizes of trash cans he uses and then lock the supports 2' and 4' in the required position.

In the embodiment shown in FIGS. 2 and 7, all of the adjustable, lockable connections between the front beams 24' and 32' and the front member 6' and between the rear beams 26' and 34', and the rear member 12' are the same and, hence, a description of one will serve as a description of all.

Figure 6:
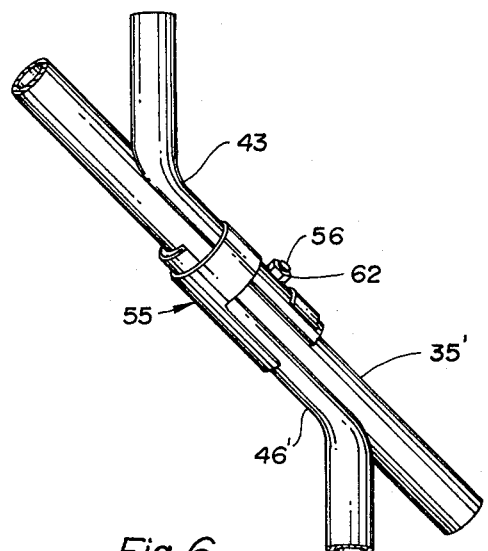
FIG. 6 is a perspective view, in enlarged scale and with parts broken away, of the FIG. 2 embodiment and shows one of the adjustable connections.

The connection between the front beam 32', the portion 46' of the lower beam member 46' and the portion 43 of the beam member 40 is shown, in enlarged scale, in FIG. 6. The U-shaped front beam 32' is fabricated from tube stock and includes a tubular portion 35' which nests between the portion 46' and the lower end portion 43, both of which have a concave semi-cylindrical shape and openings 52 extending therethrough. The tubular portion 35' lies in the same plane as its support 4'. The tubular portion 35' has a plurality of openings 54 therethrough, any one of which can be brought into alignment with the openings 52. In the particular embodiment shown, the tubular portion 35' has five openings and hence any one of five positions can be selected for the support 4'.

Figure 3:
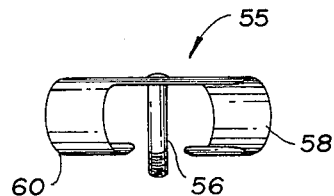
FIG. 3 is a side view of a connector for the adjustable connections of the trash hauler shown in FIG. 2.
Figure 4:
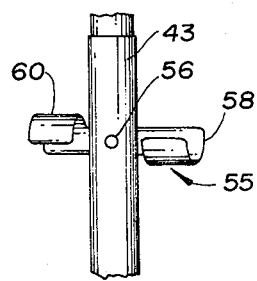
FIGS. 4 and 5 show the operation of the connector of FIG. 3 in forming the connections.
Figure 5:
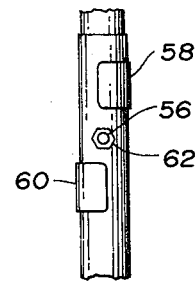

When the support 4' is in the desired one of the five positions, it is locked in that position by means of a locking member shown in FIG. 3 at 55 and operative as shown in FIGS. 4 and 5. The locking member 55 is formed from resilient sheet stock and may have a pivot pin 56 extending therefrom. Preferably, as shown in FIG. 9, a bolt 45 is provided instead of the pivot pin 56 to extend through the locking member 55. The bolt 45 or the pivot pin 56 is of a size to fit through the openings 52 and 54. The locking member 55 has a first semi-cylindrical portion 58 to one side of the pivot pin 56 which extends through only slightly more than 180° and a second semi-cylindrical portion 60 to the other side of the pivot pin 56, having the same structure as the first semi-cylindrical portion 58 but facing in the opposite direction. The spacing between the portions 58 and 60 is greater than the combined diameter of the tubular portion 35' and the two semi-cylindrical shaped portions 43 and 46' of the beam 40 and the front member 6' between which the tubular portion 35' is nested. Hence, with the locking member 55 positioned in transverse relationship to the tubular portion 35' and the portions 43 and 46', as shown in FIG. 4, the pin 56 is inserted through the aligned openings 52 and 54, and the locking member 55 is then rotated to cause the portions 58 and 60 to resiliently snap around the nested tubular portion 35' and the portions 43 and 46', as shown in FIG. 5. Because the portions 58 and 60 extend through more than 180°, once they are snapped into place around the nested tubular portion 35' and the portion 43 of the beam 40 and the portion 46' of the front member 6', they remain in that position. To secure the resulting connection, the free end of the pivot pin 56 is threaded and a complementary threaded nut 62 is threaded onto the end of the pivot pin 56.

A different type of connector for any of the adjustable connections is shown in FIG. 8 in the form of curved tube clamps 55' and bolts 45'. The bolts 45' extend through openings in the tube clamps and any aligned apertures in the handles 16''' or 18''', the tubular portion 35' and the portion 50' to adjustably secure all of the above-mentioned parts together. The bolt 45' as bolt 45, may be further secured with a nut (not shown).

In the embodiments shown in FIGS. 2, 7, 8 and 9, all of the adjustable lockable connections between the upper and lower beams 20', 28', 22' and 30' and their corresponding front and rear beams 24', 32', 26' and 34' are the same and hence a description of one will serve as a description of all.

With reference to FIG. 7 one end portion 64 of the front beam 32' telescopes into the upper beam 28' which has an opening 66 extending transversely therethrough. The end portion 64 of the front beam 32' has a plurality of openings 68 extending transversely therethrough any one of which can be brought into alignment with the opening 66. In the particular embodiment shown, the end portion 64 of the front beam 32' has five openings and hence any one of five positions can be selected for that adjustable connection.

When the desired length of the support 4' has been properly determined it is locked in that position by means of a screw 70 which fits through the openings 66 and 68 to secure the upper beam 28' to the end portion 64 of the front beam 32'.

Alternatively, the openings 68 in the end portion 64 of the front beam 32' can be eliminated so that the screw 70 lockingly engages the outer surface of the end portion 64 in any desired telescoping position of the end portion 64 within the upper beam 28' as in the embodiment of FIG. 1.

Each of the upper and lower beams 20', 22', 28' and 30', the front and rear beams 24', 32', 26' and 34', the beam members 6' and 12', the upper beam members 40 and 42 and the handles 16, 16', 16'', 16''' and 18, 18', 18'' and 18''' are individually made from tube stock to reduce the size of the carton or container in which the unassembled trash can hauler is stored and carried.

While different embodiments of the trash can hauler have been shown and described herein in detail, those skilled in this art will recognize various alternative designs and embodiments for practicing the present invention as defined by the following claims.

What is claimed is:

1. A trash can hauler comprising:
a pair of trash can supports, each comprising (a) an upper beam having a forward end and a rearward end and adapted to laterally support trash cans, (b) a lower beam having a forward end and a rearward end and spaced from and extending parallel to the upper beam and adapted to support trash cans thereon, (c) a bent front beam having adjustable telescopic connections to the forward ends of said upper and lower beams, and (d) a bent rear beam having adjustable telescopic connections to the rearward ends of said upper and lower beams; the upper and lower beams of each of said trash can supports being in planes which are at an angle to each other, the lower beam of said supports being positioned in a horizontal plane and being spaced from and parallel to each other, and the upper beams of said supports being spaced from and parallel to each other, the spacing between the upper beams being greater than the spacing between the lower beams, said front and rear beams adapted to laterally support trash cans received on the lower beams at the front and the rear of the hauler;
a front member being connected to both of said front beams at selected ones of a first plurality of attachment locations and having a lower beam member extending below the horizontal plane with at least one ground-engageable, rotatable wheel connected thereto wherein said wheels are disposed in front of and below said front member to prevent interference with a trash can supported on said lower beams adjacent the front member; and
a rear member having (a) a lower ground-engageable portion and (b) a pair of spaced, upper portions, each of said spaced upper portions being connected to the corresponding rear beam of said trash can supports at selected ones of a second plurality of attachment locations.

2. The hauler as claimed in claim 1 including at least one U-shaped upper beam member having a pair of spaced portions, one of said spaced upper portions having a connection to one of said trash can supports at one end thereof; and the other of said spaced upper portions having a connection to the other of said trash can supports at the same end thereof.

3. The hauler as claimed in claim 1 or claim 2 including removable locking members for securing said connections after the trash can supports are moved in their respective angled planes and relative to said front and rear members to positions in which the lower beams of said supports are spaced sufficiently to support the bottom of a trash can placed thereon and in which the upper beams of said supports are spaced sufficiently to be adjacent the sides of the trash can to thereby prevent lateral tipping thereof.

4. The hauler as claimed in claim 3 wherein at least one of said locking members includes a pair of semi-cylindrical shaped portions opening in opposite directions, a medial portion interconnecting said semi-cylindrical shaped portions and a pivot pin extending from said medial portion.

5. The hauler as claimed in claim 1 wherein each of said beams and members are fabricated from tube stock.

6. The hauler as claimed in claim 1 wherein the front and rear beams of each of said supports are entirely within the angled planes of their respective supports.

* * * * *